Oct. 6, 1925. 1,556,420
E. M. CHANDLER
ATTACHMENT FOR UTENSILS AND METHOD OF MAKING THE SAME
Filed Jan. 21, 1922
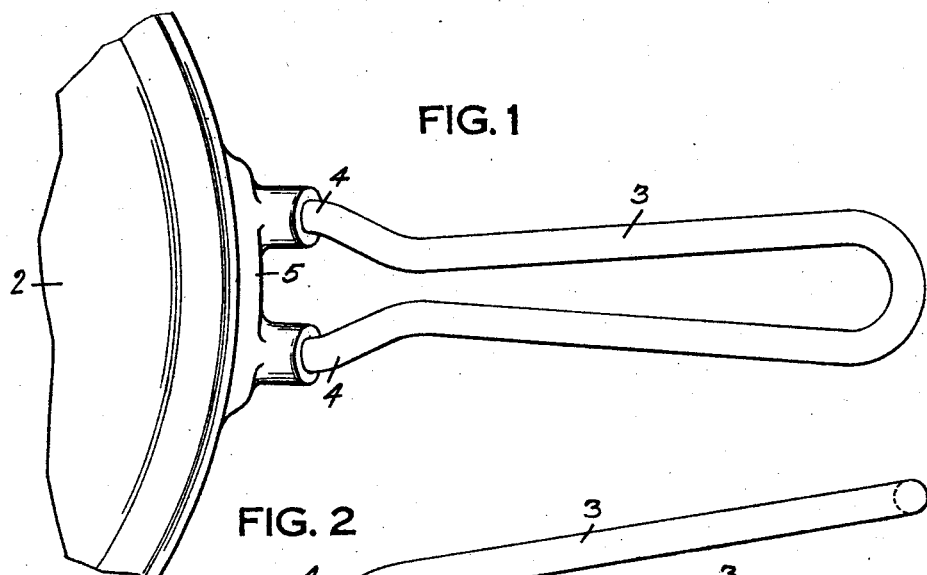
FIG. 1
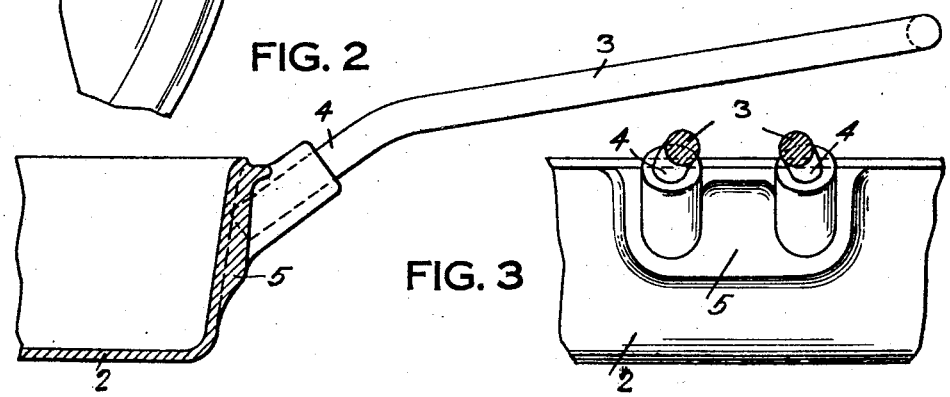
FIG. 2
FIG. 3
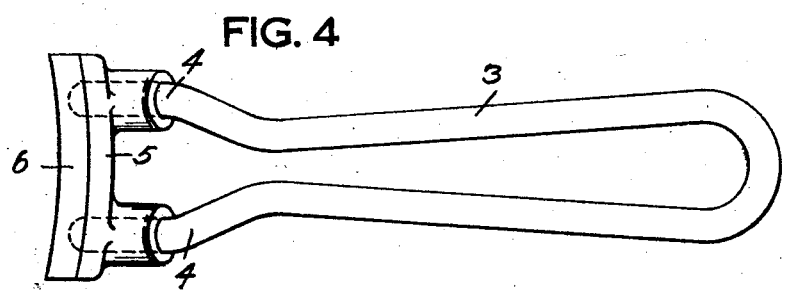
FIG. 4
INVENTOR
Edward M. Chandler
By Kay Totten Brown
  attys Patented Oct. 6, 1925.

1,556,420

UNITED STATES PATENT OFFICE.

EDWARD M. CHANDLER, OF NEW KENSINGTON, PENNSYLVANIA.

ATTACHMENT FOR UTENSILS AND METHOD OF MAKING THE SAME.

Application filed January 21, 1922. Serial No. 530,948.

*To all whom it may concern:*

Be it known that I, EDWARD M. CHANDLER, a citizen of the United States, and resident of New Kensington, in the county of Westmoreland and State of Pennsylvania, have invented a new and useful Improvement in Attachments for Utensils and Method of Making the Same; and I do hereby declare the following to be a full, clear, and exact description thereof.

My invention relates to attachments, such as handles, rings, clips, etc. for cooking or other utensils.

In the case of cooking or other utensils made of aluminum it has been customary, heretofore, to form the handles, ears, rings, clips, etc. of steel secured by rivets to the utensil. Steel is the metal employed for these attachments because of its greater strength. On account of the unequal expansion and contraction of these dissimilar metals when subjected to heat the attachments were liable to work loose and in time become completely detached. Furthermore this mode of attachment was unsanitary in that it allowed dirt, grease or other foreign matter to collect in and around the rough spots where the rivets were located, making cleaning difficult, and furthermore as the parts became loose the water or other fluid gained admittance, which resulted in the rusting and corroding of the steel.

The object of my invention is to provide a simple and efficient means of securing the various kinds of attachments to cooking or other utensils where said attachments are of a different metal than the utensils, whereby the attachments are securely and permanently held in fixed relation to the utensil, so that there is no opportunity for the attachment to work loose or become detached.

In the accompanying drawing Fig. 1 is a plan view of a portion of the utensil showing my invention applied thereto; Fig. 2 is a vertical elevation partly in section; Fig. 3 is a face view showing the handle in section; and Fig. 4 is a plan view of the attachment prepared ready for securing to a utensil.

As my invention is particularly applicable to the securing of steel handles, ears, rings, etc. to aluminum utensils, I will describe my invention more particularly with reference to such use, although I do not wish to confine it exclusively to utensils made of aluminum.

The numeral 2 designates a suitable utensil formed of aluminum or other metal, to which the handle 3 is to be secured. In a utensil of this character, such as a frying-pan, a rigid handle is employed, and this handle is preferably made of steel in the form of a wire of heavy gauge, and consequently with a certain amount of resiliency. The handle is bent in the form of the letter U with the outwardly and downwardly extending portions 4 at its inner end. The inner ends 4 of the handle 3 are embedded in, or enshrouded by, the attaching element 5 which is likewise formed of aluminum or of the same metal as the frying-pan 2. The attaching element 5 may be secured in any suitable manner to the ends 4 of the handle, and in the form illustrated the said attaching element is cast around the said ends, so as to form a practically integral connection with said handle.

The attaching element 5 is curved slightly as at 6 on its inner face to conform to the curve of the frying-pan 2, and said attaching element is welded or otherwise secured to said frying-pan. If welded the oxyacetylene flame may be employed, and when this welding has been accomplished there will be a smooth, even joint between said attaching element and said frying-pan, the metal of one gradually blending with the metal of the others, so that there are no rough places or shoulders for the collection of dirt or other foreign matter. This makes it possible to clean the handle and the parts forming the attachment, so that it can be kept in a clean sanitary condition.

The attaching element might be secured to the frying-pan by means of rivets and there would not be the liability of the rivets working loose, due to the fact that the attaching element and the frying-pan are of the same metal and there is no unequal expansion or contraction to cause the loosening of such rivets.

By forming the handle of steel wire bent in the shape illustrated the handle is free to expand and contract without in any way affecting its connection with the attachment plate.

What I claim is:

1. An attachment for an aluminum cooking or other utensil, of a different metal from that of the utensil, formed of a piece of spring metal bent in the form of a U, the free ends of said piece of metal having cast around them an attaching element of aluminum, said element being adapted to be welded to said utensil.

2. The method which comprises providing an aluminum cooking utensil, forming an attaching member by casting it therein of a material having a coefficient of expansion substantially equal to that of the utensil, securing a handle of yieldable material to said member, and attaching said member to said utensil.

In testimony whereof, I, the said EDWARD M. CHANDLER, have hereunto set my hand.

EDWARD M. CHANDLER.